March 23, 1937.  E. H. PIRON  2,074,340
VEHICLE SPRINGING SYSTEM
Filed April 17, 1933  2 Sheets-Sheet 1
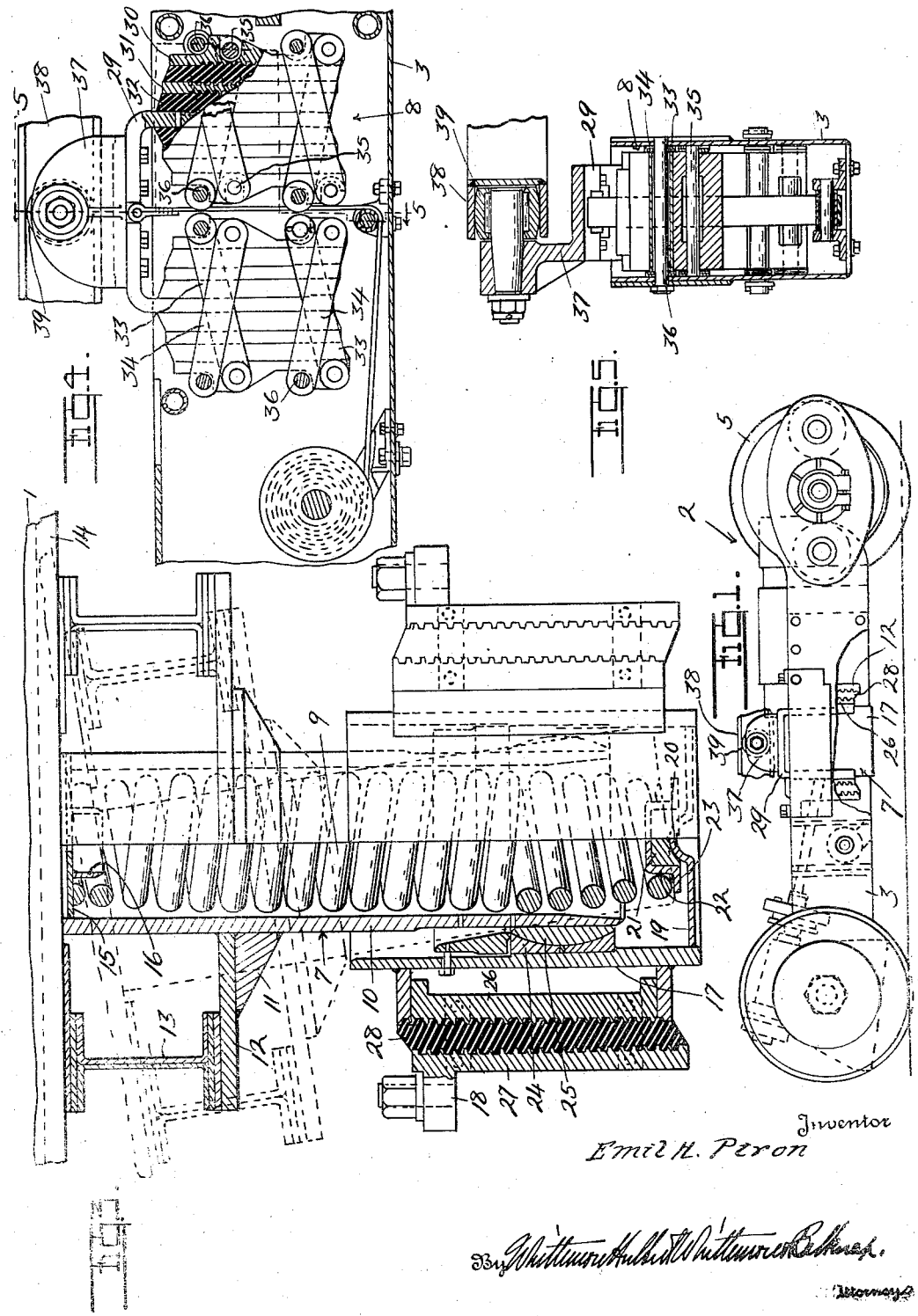
Inventor
Emil H. Piron March 23, 1937.  E. H. PIRON  2,074,340
VEHICLE SPRINGING SYSTEM
Filed April 17, 1933  2 Sheets-Sheet 2
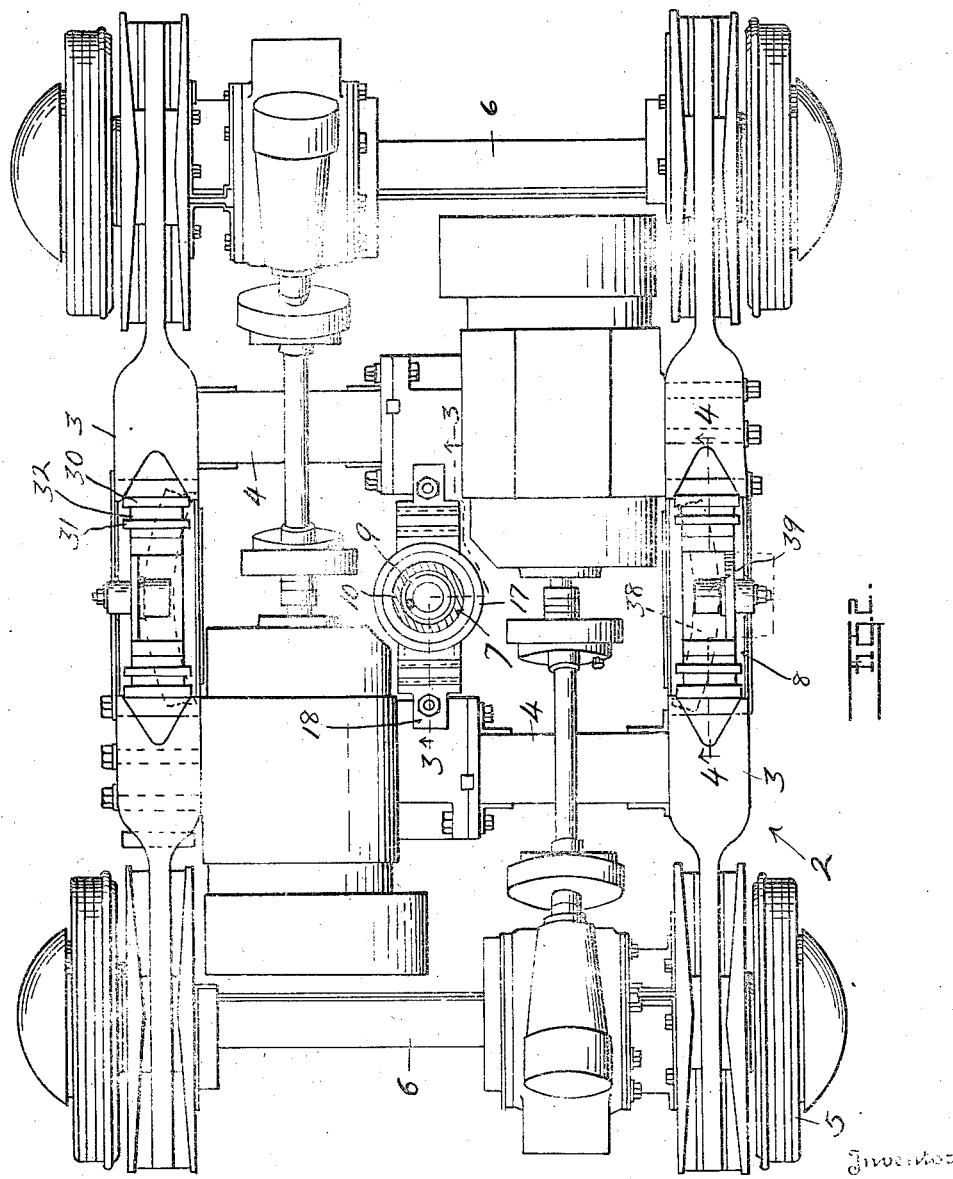
Inventor
Emil H. Piron
Attorneys Patented Mar. 23, 1937

2,074,340

UNITED STATES PATENT OFFICE 2,074,340

VEHICLE SPRINGING SYSTEM

Emil H. Piron, Highland Park, Mich., assignor, by mesne assignments, to Transit Research Corporation, New York, N. Y., a corporation of New York Application April 17, 1933, Serial No. 666,607

7 Claims. (Cl. 105—199)

This invention relates to springing system for rail vehicles and has for its object to provide such a system, including the bolster springs and the support therefor, which will accommodate every motion of the car body without lost motion connections and which will provide greater riding comfort for the passengers.

It is known that certain vibrations are comforting while others are discomforting even to the point of being nauseating and tests have shown that physical comfort or discomfort is measureable, for a given frequency, in terms of the values of accelerations transmitted to a car body. It is therefore an object of the present invention to provide a springing system capable of so altering the accelerations of impulses encountered thereby that the nature of the vibrations transmitted to the car body will be of a comforting order as far as practicable.

In a rail vehicle, the car body is capable of several major motions, among which are 1. A purely vertical motion of the car body with respect to its wheels,
2. A substantially vertical motion of one end of the car body with respect to the wheels and its other end, known as pitching,
3. A transverse motion known as rolling,
4. A substantially transverse horizontal motion known as nosing, and
5. A certain amount of longitudinal motion with respect to the truck upon acceleration or deceleration thereof.

If a spring be given a series of loadings and the value of the loadings be plotted against the resultant deflection, the result will give the load-deflection curve for that spring. The ratio of an increment of load to the corresponding increment of deflection is known as the load-deflection ratio. The period is given by the equation $$r = 2\pi \sqrt{\dfrac{w}{\dfrac{\Delta w}{\Delta x} g}}$$

where $g$ is the acceleration due to gravity, $w$ is the weight or loading, and $x$ the deflection. It can be shown in general that the acceleration of an oscillation under a given impulse increases as the period decreases and hence the springing system should have as long a period as possible. If the vehicle is to be equally comfortable irrespective of the load or number of passengers carried, it is also evident that the period of oscillation should be constant. This is a requirement that the ratio $$\dfrac{w}{\dfrac{\Delta w}{\Delta x}}$$

equal a constant. This ratio may be written as an equation $$\dfrac{\Delta w}{w} = c \Delta x$$

where $c$ is constant. The integral of this equation is $\log_e w = cx + c_1$ where $c_1$ is another constant. This, then, is the equation of the load deflection curve of a springing system preserving a constant period of oscillation in a vertical direction irrespective of the load if the spring be vertical. Or if the period $r$ is constant in the above original equation, $r$ is obtained by the relation 9.7876 $r^2$ ($\log_e w_2 - \log_e w_1$) = ($x_2 - x_1$) where $w_2$ is the maximum load expressed in pounds, $w_1$ is the minimum load, $x_2$ the deflection under maximum load expressed in inches, $x_1$ the deflection under minimum load and the acceleration of gravity is expressed in inches per second per second. If the foregoing be applied to the bolster springs of a track vehicle this period $r$ is lengthened slightly by the presence of other springs between the bolster and the rails,—namely, by journal springs and by resilient wheels.

It will be understood that if a springing system be employed having the typical load deflection curve for an ordinary steel compression spring the above ratio requirement would not be complied with. It is therefore an object of the present invention to provide a springing system in which the above ratio requirement will be complied with in order that the car may be equally comfortable for vertical acceleration regardless of the load carried thereby.

The pitching of the car being a vertical motion involving a movement of one end of the car with respect to the other end, the springing problems are closely allied to the pure vertical motion described above, provided there be no restriction thereof as by binding of the parts. It is another object of this invention to provide a center pin structure, including a universally mounted center supporting member capable of limited movement in any direction in order that the above related ratio requirements for vertical acceleration will be applied also to pitching movements.

In general, if the load deflection ratio of the bolster springs were exactly the same when resisting rolling of the car as they are when resisting pure vertical motion the rolling motion would be discomforting because the period would be too short. In conventional practice, this is sometimes overcome by shortening the distance between the side springs. However, such a ready solution may not always be possible because of lack of room and other practical considerations. If a center spring alone should be employed, the body would have substantially a two point support (one center spring on each truck) so that if the car should be tilted it would not return to normal and hence the rolling period would be infinite. If side springs be added, and if the center spring be articulated for the purpose, the period of the roll will largely depend upon the softness of the side springs. It is therefore another object of this invention to provide a springing system for residence between a truck and a car body composed of a center spring and side springs so arranged and so connected to the truck and car body as to jointly assume the car body loading at all times and so constructed as to impart a constant period of roll to the car body regardless of the loading, the period being independent of the period of vertical oscillation.

The rolling of a car body is due to irregularities in the track profile and to the fact that the trucks assume an angularity with respect to the tracks in the direction of travel. When the wheel flanges contact the rails there is an impact which causes the wheels and the truck to assume a new direction. The car body tends to maintain its original direction so that if there be no lateral cushioning there would be severe stresses at all points of support and the car body would be severely jolted.

Such cushioning, in conventional practice, is usually accomplished by providing a truck bolster suspended by swing links. However, a truck bolster may not always be practical or desirable, as in the type of truck illustrated herewith. It is therefore an object of the present invention to provide a springing system including a center spring and side springs and to provide means associated individually with each spring of such a system for cushioning lateral movement of the truck with respect to the body.

If pure rolling motion be considered as the rotation of a mass about its center of gravity, it is immediately obvious that such rolling motion can never occur, except by accident, in a spring mounted vehicle body. This follows immediately from the fact that the vehicle body is constrained by a center pin, spring and other attachments to travel in very complex paths. What is called rolling motion in the art is therefore not rolling motion in the pure sense defined above.

To the extent that the center bearing or center pin support does not move laterally with respect to the ground, it forces the car body in transverse motion to rotate about it as a center. In order to lengthen the period of transverse oscillation, the point about which the oscillation centers must be lowered as far as practicable. It is therefore another object of the invention to lower the point of support and the point of contact of the center pin driving member to a position close to the road bed, the driving member being an elongated pendant from the floor of the car to a position well below the top of the truck frame.

In conventional practice and likewise in the present instance, relative motion upon acceleration or deceleration between the axles and frame, and likewise relative motion between the frame and the car body is provided. Unless such relative motion be cushioned, an impact results which causes the emission of noise, sets up oscillations in the car body and in the entire truck and which causes a discomforting jolt to the passenger. It is therefore another object of this invention to provide a cushioning means between the truck and the car body capable of yieldingly resisting relative motion of the truck and body upon acceleration and deceleration.

It is a further object of the invention to provide a springing system for a car body in which there will be no metal to metal contact between the truck frame and the car body and which will employ resilient cushioning preferably in the form of rubber elements, so constructed and arranged as to constitute supporting means as above described and which will command all movement of the car body in addition to providing that the car be made more nearly silent in operation.

A further object is to provide a truck of neat appearance and compact form by employing deep side girders for maximum strength and by employing the girders as housings for the side springs.

Other objects and advantages, either directly described or indirectly accruing from the favorable relation of parts will become hereinafter more fully apparent as reference is had to the accompanying drawings, wherein my invention is illustrated by way of example and not in a limiting sense, and in which Figure 1 is a side elevation, partly broken away, of a vehicle and its springing system showing an embodiment of my invention;

Figure 2 is a plan view of the truck of the vehicle;

Figures 3 and 4 are cross sections, respectively, on the lines 3—3 and 4—4 of Figure 2;

Figure 5 is a cross section on the line 5—5 of Figure 4.

The vehicle illustrated in the present instance is a rail vehicle, such as a street car, having the car body 1 which is mounted upon trucks, but one truck 2 being shown. The frame of each truck comprises the side girders 3 and the cross beams 4 secured to the side girders. The wheels 5 for engaging the rails are mounted upon the axles 6 which are journalled at the ends of the side girders.

For supporting the car body upon the trucks, I have provided a springing system comprising the center spring 7 and the side springs 8 between the car body and each truck and this springing system is so constructed and arranged that the car body will have as comfortable riding qualities as practicable.

The center spring is a center pin structure of the type shown and described in my copending application Serial Number 666,606, filed April 17, 1933. This center pin structure comprises the upright coil spring 9 and the upright rigid or stiff center pin or king pin 10, the latter being cylindrical and extending substantially the length of the coil spring and housing the major portion thereof. The center pin extends through the bolster plates 11 and 12 and is preferably integrally secured thereto as by welding, these plates in turn being preferably welded together. The upper plate 12 supports the cross beams or body bolsters 13 of the car body, and these cross beams or body bolsters support the floor 14 of the car body, this floor being preferably located immediately above the upper end of the center pin. This upper end is closed by the plate 15 which is preferably welded thereto and the upper convolution of the coil spring 9 engages this plate and is guided by the cylindrical pilot 16 secured to and depending from this plate. The construction is such that the center pin guides the coil spring but allows relative movement of its convolutions.

The center pin structure also comprises the supporting base 17 and the diametrically opposite devices 18 carrying the base. The base is in the nature of a rigid or stiff cylindrical member which encircles and houses the lower portions of the coil spring 9 and the center pin 10 and this base is of greater diameter than the center pin to provide clearance for limited angular movement of the center pin relative to the base. The base has its lower end closed by the plate 19 which is secured thereto preferably by welding and which is provided with the central or axial upwardly extending rounded or substantially hemispherical boss 20. 21 is a bearing having an arcuate lower face for fitting the upper face of the base, this bearing being located within the cup-shaped supporting washer 22 having the annular flange 23 which is engaged by the lower convolution of the coil spring 9. The washer serves to laterally position the lower convolution and the washer and bearing are universally supported upon the base. The base has fixedly secured therewithin the horizontally split outer bearing member 24 in which is snared in universal assembly the inner bearing member 25 having an inner cylindrical face in sliding contact with the cylindrical outer surface of the center pin 10.

The center pin base 17 extends downwardly between the cross beams 4 of the truck as far as possible, while maintaining a desired road clearance. Preferably, the base extends downwardly through the plane containing the axes of the truck wheels 5, as shown more particularly in Figure 1, and the universally mounted guide member 25 in which the center pin 10 slides is at or below the level of the plane containing the wheel axes, as also shown in this figure.

The devices 18 of the center pin structure carry the center pin base upon the truck in a manner to yieldingly resist relative motion of the car body and the truck. These devices are alike and each is received between the base and an adjacent cross beam of the truck and comprises the inner and outer plate members 26 and 27 respectively and the rubber cushioning element 28 between these plate members. The plate members extend vertically and also transversely of the truck and the inner plate member is fixedly secured to the center pin base 17 and the outer plate member is mounted upon and detachably fixedly secured to the adjacent cross beam 4 of the truck. The cushioning element is maintained under continuous compression between the plate members in a direction normal to the direction of the loading imposed by the car body through the center pin base and this compression is of sufficient magnitude to set up a frictional locking engagement of the cushioning element with the plate members capable of obviating slippage of the cushioning element and plate members during operation.

With this construction, the suspension and swivel means for the car body is capable of articulated movement in every direction and adapted to propel the car body from a point well below the top of the truck frame and also as close to the road bed as practical. At the same time, the car body is resiliently supported upon the base and lost motion clearances are eliminated, thereby eliminating noise and avoiding localized fatigues and severe stresses generally. Furthermore, the construction is such that the center pin is capable of universal movement relative to its support, but this particular movement is definitely limited by the support, as indicated in dotted lines in Figure 3, illustrating maximum angularity of the various parts with respect to the base.

As shown, each of the side springs 8 is of the type shown and described in the copending application of Clarence F. Hirshfeld, Serial Number 664,253 filed April 3, 1933, which has since matured into U. S. Patent No. 1,996,512 granted April 2, 1935, although other springs could be employed provided they met the requisites set forth in the preamble. Each side spring is housed within a side girder 3 laterally opposite the center spring, the side girder being hollow and having an opening in its top. Each side spring comprises the supported or load imposing plate member 29, the outer supporting or load receiving plate members 30 and the intermediate plate members 31, all being substantially parallel and preferably extending vertically and also longitudinally of its respective side girder. Between the adjacent plate members are the rubber cushioning elements 32. Pivotally connected to the upper and lower portions of the outer plate members 30 are the pairs of the criss-crossing links 33 and 34, each of which is inclined upwardly from the pin 35 pivotally connecting the same to its plate member to the remote supporting pin 36 on the opposite side of the spring device, the latter pin being supported by the side girder. The pins 35 and 36 of each pair of links have their axes respectively in the same horizontal planes and the links of each pair are of the same length. These links in the normal position of the spring device urge the outer plate members toward each other to impose an initial pressure on the cushioning elements of sufficient magnitude to set up a frictional lock against slippage of these cushioning elements relative to the plate members without other bonding means.

The supported or load imposing plate member 29 of each side spring has secured thereto the member 37 which extends upwardly through the opening in the top of the side girder and which is slidably connected at its upper end to the car body by the horizontal circular track 38 which is mounted upon the car body concentric with the axis of the center pin 10. The roller 39 is preferably provided at the upper end of the member 37 engageable between the upper and lower flanges of this track. This arrangement is such that the car truck may swivel about the center spring without interference by the side springs.

With the above construction of springing system comprising the center spring and the side springs, both the center spring and the side springs jointly assume the vertical static loading of the car body on the truck and this loading is resisted by the rubber cushioning elements of the center spring in shear and by the rubber cushioning elements of the side springs in shear and by compression.

The side springs also resist the rolling of the car body relative to the truck. The construction of each side spring is such that the load deflection curve may be readily changed by predeterminately proportioning the amount of loading borne in shear to that borne in compression by varying the lengths of the links and their normal original angularity. This springing system has a constant period of oscillation for both vertical motion and rolling motion of the car body relative to the truck irrespective of the loading imposed thereon by the car body. Also the construction of springing system is such that the rubber cushioning elements of both the center spring and the side springs cushion relative horizontal movement of the car body and truck in both transverse and fore and aft directions and furthermore these rubber cushioning elements isolate the car body and truck from metal to metal contact, thereby eliminating objectionable noise.

What I claim as my invention is:

1. In combination in a rail vehicle, a truck, a body for said truck, a springing system for said body comprising a resilient center support and side springs, said side springs comprising rubber and means for transmitting the loading of the car body to said rubber partially in shear and partially in compression, and means for predeterminately proportioning the amount of said loading borne in shear to that borne in compression to impart a substantially constant period of rolling oscillation to said body irrespective of the variation in static loading thereon.

2. In a rail vehicle, a vehicle truck, a car body for said truck, a pivotally mounted center pin and side springs each independently supporting a portion of the weight of said body on said truck, said side springs each having a rigid member forming part thereof and a roller carried by said member and connected to said body by a horizontal circular track above and below said rollers whereby said truck may swivel about said center spring.

3. In a rail vehicle, a vehicle truck having a center pin support thereon, a car body, yieldable means between said center support and said truck, a center spring and guide therefore in said support having limited free universal movement therewith, said center spring and guide being resisted in additional movement by said yieldable means, and side springs between said car body and said truck resisting all rolling movement of said body on said truck.

4. In a rail vehicle including trucks and a body supported by and swivelled on said trucks, a springing system for supporting said body from said trucks having a substantially constant period of oscillation for rolling motions of the body, a freely rotatable center pin construction for each of said trucks comprising a driving and swivelling connection between said trucks and said body, and rubber pads through which driving and retarding forces are transmitted to said center pin, said rubber pads also comprising means to damp the lateral motions of said body relative to said trucks.

5. In combination in a rail vehicle, a truck, a body for said truck, a springing system for supporting said body including a center support and side springs over which the static loading of the body is distributed, each of said side springs being constructed and arranged to resist rolling of the car body according to a load deflection curve in which the ratio of the load to the load deflection ratio is substantially constant.

6. In a rail vehicle, a vehicle truck, a car body for said truck, a universally mounted center pin operatively connecting said body and said truck, resilient cushions associated with said center pin through which driving and retarding forces are transmitted between said body and said truck, and side springs supporting said body from said truck, said side springs largely resisting rolling motions of said body on said truck, said cushions also resisting such rolling motions to a lesser degree.

7. In a rail vehicle including trucks and a body supported by and swivelled on said trucks, a springing system for supporting said body from said trucks having a substantially constant period of oscillation for rolling motions of the body, a freely rotatable center pin construction for each of said trucks comprising a driving and swivelling connection between said trucks and said body, and rubber pads through which driving and retarding forces are transmitted to said center pin, each of said pads residing between parallel plate members with one of said plate members being fixedly secured to its truck, said rubber pads also comprising means to damp the lateral motions of said body relative to said trucks.

EMIL H. PIRON.